(12) United States Patent
Schulzte et al.

(10) Patent No.: US 8,559,300 B2
(45) Date of Patent: Oct. 15, 2013

(54) REDUNDANT COMMUNICATIONS NETWORK

(75) Inventors: Stephan Schulzte, Lohr am Main (DE); Alexander Tchekler, Neustadt (DE); Roland Ackermann, Lohr-Steinbach (DE); Gerald Noack, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 600 days.

(21) Appl. No.: 11/627,127

(22) Filed: Jan. 25, 2007

(65) Prior Publication Data

US 2007/0192449 A1    Aug. 16, 2007

(30) Foreign Application Priority Data

Jan. 30, 2006    (DE) .................. 10 2006 004 339

(51) Int. Cl.
*G01R 31/08*    (2006.01)
*G06F 11/00*    (2006.01)

(52) U.S. Cl.
USPC ........................................................ 370/223

(58) Field of Classification Search
USPC ........................................................ 370/223
See application file for complete search history.

(56) References Cited

U.S. PATENT DOCUMENTS

| | | | |
|---|---|---|---|
| 4,539,655 A * | 9/1985 | Trussell et al. | 710/100 |
| 4,542,496 A * | 9/1985 | Takeyama et al. | 370/224 |
| 5,187,708 A * | 2/1993 | Nakatani et al. | 370/469 |
| 6,594,232 B1 * | 7/2003 | Dupont | 370/224 |
| 7,009,995 B1 * | 3/2006 | Bohrer et al. | 370/460 |
| 7,024,257 B2 * | 4/2006 | Pearce et al. | 700/72 |
| 7,142,504 B1 * | 11/2006 | Uzun | 370/224 |
| 2004/0052450 A1 * | 3/2004 | Morrison | 385/24 |
| 2006/0039291 A1 * | 2/2006 | Sinha et al. | 370/248 |
| 2006/0045097 A1 | 3/2006 | Kynast | |
| 2006/0045119 A1 | 3/2006 | Kynast | |

FOREIGN PATENT DOCUMENTS

EP    10 2004 041 093    3/2006

OTHER PUBLICATIONS

English translation of "error tolerant communication system for highly dynamic drive reulating means", chapter 5, Stephan Schultz,1995.*

* cited by examiner

*Primary Examiner* — Mark Rinehart
*Assistant Examiner* — Maharishi Khirodhar
(74) *Attorney, Agent, or Firm* — Michael J. Striker

(57) ABSTRACT

A method for operating a redundant ringlike communications network, that communicates bidirectionally, includes communicating at least one primary participant and at least two secondary participants with one another by a data transmission device; communicating the secondary participants with one another directly by the data transmission device, indirectly by the primary participant and the data transmission device, or both; and exchanging by the participant the data to be exchanged between the secondary participants, between its data transmission device connections.

14 Claims, 2 Drawing Sheets

REDUNDANT COMMUNICATIONS NETWORK

CROSS-REFERENCE TO A RELATED APPLICATION

The invention described and claimed hereinbelow is also described in DE 10 2006 004 339.1, filed Jan. 30, 2006. This German Patent Application, whose subject matter is incorporated here by reference, provides the basis for a claim of priority of invention under 35 U.S.C. 119 (a)-(d).

BACKGROUND OF THE INVENTION

The invention relates to a method for operating a redundant, ringlike communications network and to a communications network which makes use of this method.

From the prior art, ringlike communications networks with redundant function, which have a primary participant or "master" and secondary participants or "slaves" are known.

German Patent Application DE 10 2004 041 093 describes one such ringlike communications network in FIG. 1a, which could for instance represent a control and drive system for shaftless production machines. Such systems utilize a so-called bidirectional double ring for communication. In the redundant case (error case), the double ring falls apart into two line topologies. Communication between secondary stations that are not affected by the malfunction then takes place solely by the recopying, via the main station, of all the data sent by secondary participants. This increases the load on the main station considerably and causes runtime delays between directly adjacent secondary participants.

SUMMARY OF THE INVENTION

The object of the invention is to assure data transmission in the event of error, to relieve the primary participant as well as possible, and as much as possible to avoid runtime delays between secondary participants.

This object is attained by means of a method for operating a redundant ringlike communications network, in particular one that communicates bidirectionally, having at least one primary participant and at least two secondary participants which communicate with one another by means of a data transmission device; the secondary participants communicate with one another directly by means of the data transmission device and/or indirectly by means of the primary participant and the data transmission device, in that the primary participant exchanges the data, to be exchanged between the secondary participants, between its data transmission device connections, in particular on the specification of a transmission speed.

The data transmission device could for instance be implemented by means of a landline or radio data transmission, which allows bidirectional communication. The data transmission device connections of the primary participant are the interfaces between the primary participant and the data transmission device. Since this is a ringlike, redundant system, each participant (both secondary participants and primary participant) includes four terminals for the data transmission device (2 inputs and 2 outputs each). The invention creates a redundant and failsafe system, since the secondary participants can communicate directly with one another independently of the primary participant and thus relieve the primary participant. Directly adjacent secondary participants thus communicate with one another over the shortest distance, which reduces the data runtime. In addition, in the event of a functional problem of the data transmission device for the secondary participants, there is still the capability of communicating by means of the primary participant.

Preferably, the primary participant exchanges all the data sent by the secondary participants solely in the event of a malfunction in the data transmission between two secondary participants on the specification of a transmission speed between secondary participants. Here, even data from secondary participants that are not affected by the malfunction are taken into account. This means that as soon as an error is present in the double ring topology, the main station begins to transmit all the data from secondary participants, which are connected to the first data transmission device connection, to the second data transmission device connection, to which further secondary stations are connected, and vice versa. It is thus assured that from the data stream, each secondary participant can receive the data intended for it. In error-free operation, the secondary participants communicate efficiently and directly with one another, bypassing the main station. The load on the primary participant's CPU is thus kept low, and despite the error, communication can be maintained.

Alternatively, the primary participant exchanges solely cross-communication data (from secondary participants intended for secondary participants) in the event of a malfunction of the data transmission between secondary participants on the specification of a transmission speed. Now, all the data sent by the secondary participants, which can also contain data for a primary participant, are no longer exchanged; instead, only those data which are in fact also intended for other secondary participants are exchanged. Data that are to be exchanged between secondary participants and the primary participant are thus not made accessible to other secondary participants. This makes the method more efficient, because the incidence of data is reduced substantially in this case.

Preferably, the method is refined still further by providing that solely those secondary participants which are affected directly by a malfunction communicate by means of the primary participant, because they in particular detect the malfunction and report it to the primary participant. In the event of an error, the main station locates the data to be copied, on the basis of the now known site of the error. Accordingly, only those data that must be exchanged by a still-functional partial line and another still-functional partial line of the communications network (see FIG. 2) are ascertained by the main station. Only these data are recopied. Data between secondary participants which are still capable of communicating with one another directly are excluded from the data stream. Only the secondary participant data affected by the malfunction, from secondary participants which are no longer able to be transmitted directly between the secondary participants, therefore find their way via the primary participant. The malfunction is communicated to the primary participant by means of the data transmission device, and from the located malfunction the primary participant controls the communication. This method increases the efficiency, because of the reduced data load in the primary participant.

Very particularly preferably, the data forwarded to a secondary participant are processed by the primary participant in such a way that they can be distinguished from data exchanged directly between secondary participants, for instance by means of manipulation of data fields within the data telegrams on which the data transmission is based. This kind of data processing by the secondary participant is also conceivable. This is especially advantageous, since because of the indirect data transmission via the primary participant, a runtime delay of the data telegrams can result. The data affected by this runtime delay are now separately marked by means of the primary participant and are thus identifiable and can be processed retroactively if needed.

In addition to the above-mentioned method step, the data are advantageously subjected to an additional data processing by the secondary participants and/or the primary participant. This kind of special treatment of the runtime-delayed data, for instance by means of an extrapolation, makes targeted runtime corrections or averaging, for instance, possible. Errors in the system from defective data are thus prevented; the system becomes stabler and less in need of maintenance.

A landline communications network is preferably based on the method of the invention, and this is based on ethernet technology or fiber optical technology, and the communication is based on a field bus standard. Ethernet technology makes it simple to manipulate the connecting lines possible, since as a rule they are based on copper lines. Ethernet has stood the test of time, is less expensive, and is less vulnerable to error. Fiber optical technology is not vulnerable to electromagnetic disturbances and increases the data security. Implementing the communications network in a field bus network (Profibus, SERCOS, CANopen, etc.) makes access to automation technology possible. If real-time-capable communication is employed, further advantageous areas of use are gained, particularly in processing time-critical data.

Very particularly preferably, a drive system, in particular for automation purposes, uses this kind of communications network, which includes an electric controller and/or drive regulator as its primary participant and electric controllers and/or electrical drive regulators as its secondary participants. The concept according to the invention enhances the availability of the machines included in the automation system.

The invention will be described in further detail below in terms of the concrete exemplary embodiments shown in the drawings.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
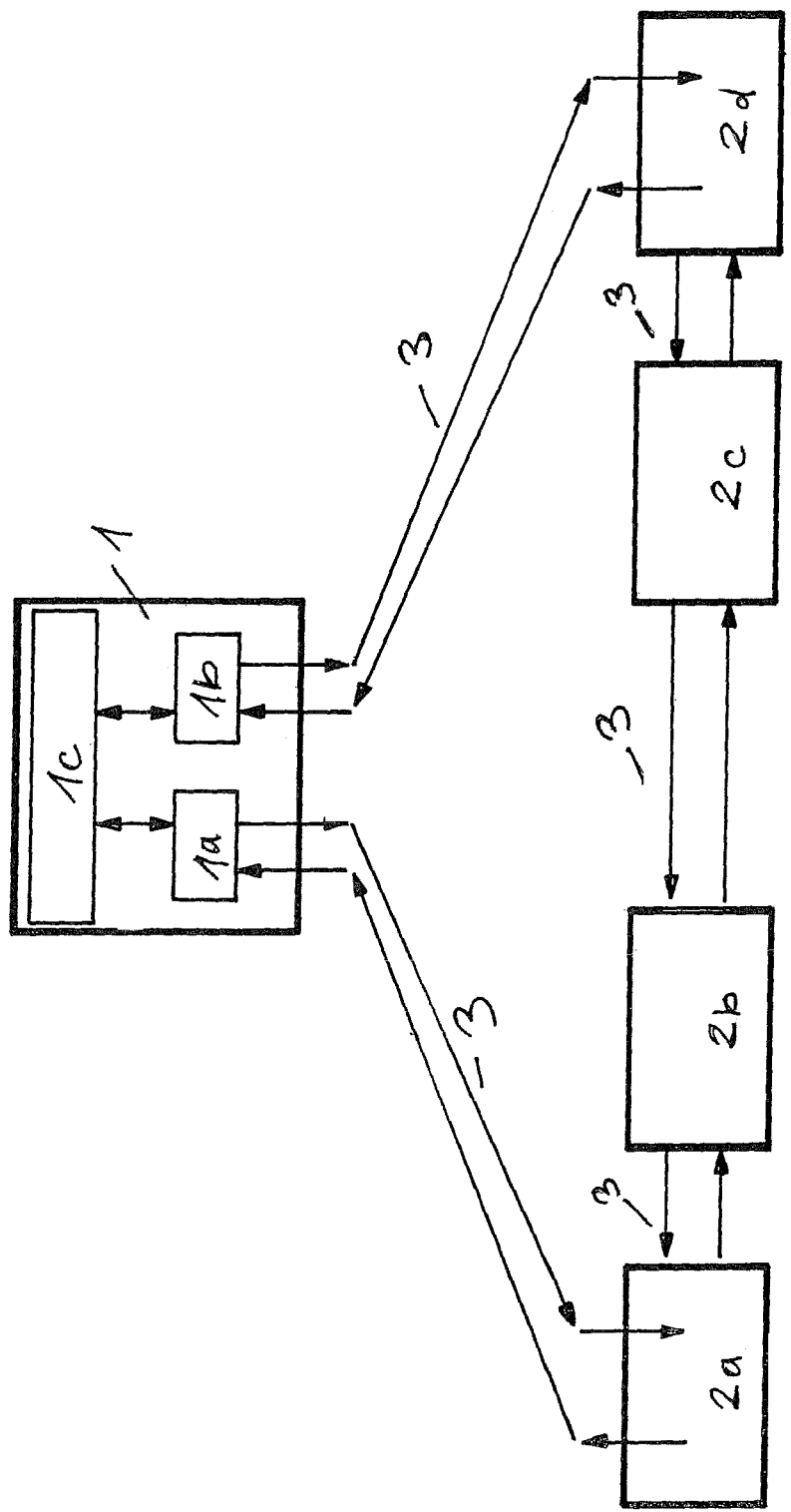
FIG. 1 shows a redundant communications network operating without malfunctions.

The communications network shown in FIG. 1 includes a primary participant 1 with a data transmission device 1c, and two network connections 1a and 1b as well as secondary participants 2a, 2b, 2c, 2d, which are connected to one another by means of the bidirectional connecting line 3. The bidirectional connecting line 3 makes a direct, bidirectional data exchange possible between the individual secondary participants 2a, 2b, 2c, 2d and the primary participant 1. In addition to the bidirectional connecting line 3, in the form of a bidirectional ring, redundancy is created by providing that secondary participants 2a, 2b, 2c, 2d can also communicate with one another by means of the primary participant 1, because it is provided that the primary participant forwards data, arriving at the input of its connection 1a (input/output), to the output of the connection 1b (input/output), by means of the data processor 1c. Thus for the secondary participant 2b, for instance, there is the capability of communicating directly with the secondary participant 2c either by means of the bidirectional connection 3 or indirectly by means of the primary participant 1.

Figure 2:
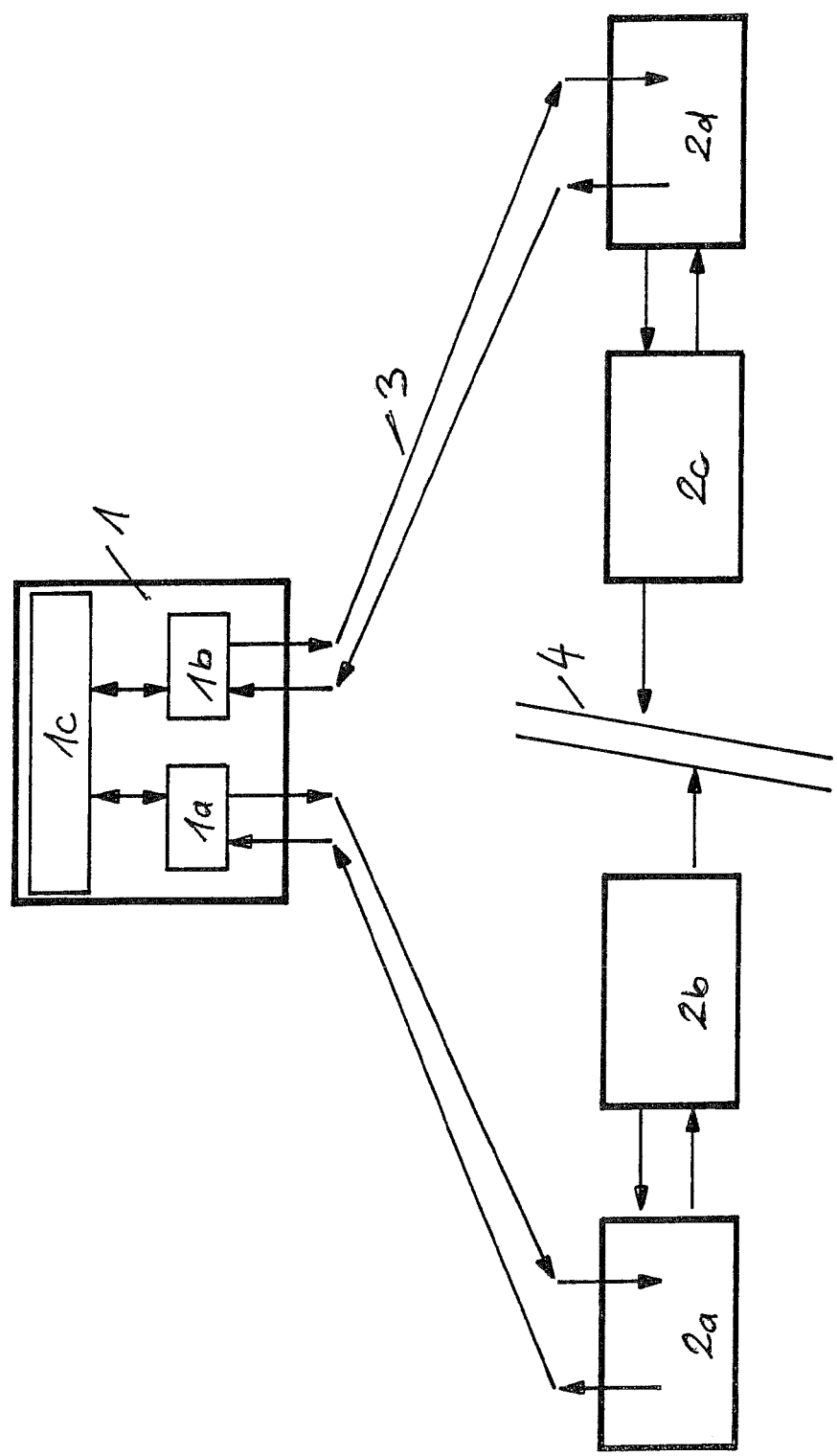
FIG. 2 shows a redundant communications network that is malfunctioning.

In FIG. 2, in the event of a line interruption 4, for instance between the secondary participants 2b and 2c, the invention can be used to maintain the data traffic between the secondary participants 2b and 2c via the primary participant 1. In FIG. 2, the ringlike communications network falls apart into a linear topology; the primary participant 1 together with the secondary participants 2a and 2b forms a first partial line, and the primary participant 1 together with the secondary participants 2c and 2d forms a second partial line. The secondary participant 2a could now, like the secondary participant 2b, communicate with the secondary participant 2c and/or 2d by means of the data forwarding function, described above, of the primary participant 1. Only in the event of an error is the detour via the primary participant 1 thus chosen, and despite the error communication is maintained. The primary participant 1 thus exchanges solely cross-communication data (useful data which are exchanged solely between secondary participants and do not include any data for the primary participant per se) in the event of a line interruption between the secondary participants, on the specification of a transmission speed, and in doing so concentrates only on the data required for the cross-communication between the secondary participants, making the method more efficient, since the data incidence in this case is substantially less.

The communications network could also be conceived such that solely those secondary participants 2b, 2c that are directly affected by the line interruption 4 communicate by means of the primary participant 1, by the provision that a secondary participant 2b, 2c detects a physically caused interruption 4 in the communications network and reports this interruption to the primary participant 1 by means of the still-functional partial line to which it is connected. In this configuration, the secondary participants 2a and 2b, on the one hand, and 2c and 2d, on the other, would communicate with one another as before, in the same way as in the error-free situation. The data between these secondary participants are thus excluded from the data stream that travels via the primary participant 1. This reduces the amount of data to be processed by the primary participant and increases the efficiency of the network still further.

In the case of forwarding to secondary participants 2a, 2b, 2c, 2d, the primary participant 1 can process data in such a way that the data can be distinguished from data exchanged directly between secondary participants. The secondary participants 2a, 2b, 2c, 2d should then be capable of being subjected to data postprocessing as needed, for instance in order to correct runtime errors. In that case, the main station 1 knows the site of the error and is informed as to which secondary stations can no longer communicate directly with one another.

In the error-free situation as well, the main station 1 could copy the cross-communication data from one connection 1a to the other connection 1b and vice versa, so that both data paths are available, that is, direct communication between the secondary participants and indirect communication via the primary participant. The computation power available in the primary participant 1 and the secondary participants 2a, 2b, 2c, 2d can thus be utilized in an application-specific way.

The bidirectional connecting lines 3 are preferably based on ethernet technology (copper lines) or fiber optical technology. Using protocols (Profibus, SERCOS I, II, III) that are usual in the context of current field bus standards enables access to the world of automation technology, so that an electric controller can for instance be conceived of as the primary participant 1 and electric controllers and/or electrical drive regulators can be conceived as secondary participants 2a, 2b, 2c, 2d. The concept according to the invention increases the availability of the machines that are implemented by means of the drive system.

The secondary participants implemented by means of controllers act as so-called substations, and the primary participant acts as a so-called head station. Drive regulators in ring or line form may be connected to each substation. This is possible at the head station itself as well, but the head station preferably performs central tasks. The head station shown in FIGS. 1 and 2 performs solely higher-order, noncentral control tasks, while the substations perform central control tasks.

It will be understood that each of the elements described above, or two or more together, may also find a useful application in other types of methods and constructions differing from the types described above.

While the invention has been illustrated and described as embodied in a redundant communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for operating a redundant ringlike communications network that communicates bidirectionally between participants of an automation network, comprising the steps of:
   providing a communications network having two network rings;
   providing at least one primary participant, wherein said at least one primary participant is configured as a master, and wherein said at least one primary participant includes a data processing device and first and second network connections;
   providing at least two secondary participants, wherein said at least two secondary participants are configured as slaves, wherein the at least one primary participant and the at least two secondary participants are connected to one another redundantly via a bidirectional connection line, wherein the bidirectional control line is based on Ethernet technology or on fiber optic technology, wherein data transmission takes place using real-time, fieldbus protocols, wherein the at least one primary participant receives at an input the first network connection, and wherein data is conducted by means of the data connection to an output of the second network connection;
   during normal operation, communicating in real-time said at least two secondary participants directly with one another bypassing said at least one primary participant;
   solely in an event of a malfunction in a data transmission between two of the secondary participants, communicating in real-time said at least two secondary participants with one another via said at least one primary participant, wherein said at least one primary participant forwards data received at one of said input terminals connected with one of said two network rings to one of said output terminals connected with the same one of said two network rings via said data transmission device, wherein said forwarding by the primary participant includes forwarding by the primary participant all data sent by the at least two secondary participants;
   wherein said at least one primary participant and said at least two secondary participants are selected from the group consisting of electric controllers and electrical drive regulators.

2. The method for operating a redundant ringlike communications network as defined by claim 1, wherein said exchanging includes exchanging the data to be exchanged between the secondary participants by the primary participant between its data transmission device connections on a specification of a transmission speed.

3. The method for operating a redundant ringlike communications network as defined in claim 1, wherein the exchanging by the primary participant includes communication by the primary participant solely of those of the secondary participants which because of the malfunction can no longer communicate directly with one another; further comprising providing by the secondary participants an action selected from the group consisting of detection of the malfunction, location of the malfunction, and both.

4. The method for operating a redundant ringlike communications network as defined in claim 3; further comprising communicating the malfunction to the primary participant by the data transmission device; and
   coordinating by the primary participant the communication on a basis of the located malfunction.

5. The method for operating a redundant ringlike communications network as defined in claim 4; further comprising subjecting the data forwarded by the primary participant to additional data processing by a participant selected from the group consisting of the secondary participants, the primary participant, and both.

6. The method for operating a redundant ringlike communications network as defined in claim 1, wherein the exchanging by the primary participant includes communication by the primary participant solely of those of the secondary participants which because of the malfunction can no longer communicate directly with one another; further comprising providing by the secondary participants an action selected from the group consisting of detection of the malfunction, location of the malfunction, and both.

7. The method for operating a redundant ringlike communications network as defined in claim 6; further comprising communicating the malfunction to the primary participant by the data transmission device; and
   coordinating by the primary participant the communication on a basis of the located malfunction.

8. The method for operating a redundant ringlike communications network as defined in claim 7; further comprising subjecting the data forwarded by the primary participant to additional data processing by means of a participant selected from the group consisting of the secondary participants, the primary participant, and both.

9. The method for operating a redundant ringlike communications network as defined in claim 1; further comprising processing the data exchanged by the primary participant between the secondary participants, between its data transmission device connections in such a way that the data can be distinguished from data exchanged directly between the secondary participants.

10. A redundant ringlike communications network that is configured to enable communication bidirectionally between participants of an automation network, comprising:
- at least one primary participant, wherein said at least one primary participant is configured as a master, and wherein said at least one primary participant includes a data processing device and first and second network connections;
- at least two secondary participants, wherein said at least two secondary participants are configured as slaves, wherein the at least one primary participant and the at least two secondary participants are connected to one another redundantly via a bidirectional connection line wherein the bidirectional control line is based on Ethernet technology or on fiber optic technology, wherein data transmission takes place using real-time fieldbus protocols wherein the at least one primary participant receives at an input the first network connection, and wherein data is conducted by means of the data connection to an output of the second network connection,
- wherein solely in an event of a malfunction in a data transmission between two of the secondary participants, said at least two secondary participants communicate with one another by means of said at least one primary participant, wherein said forwarding by the primary participant includes forwarding by the primary participant all data sent by the at least two secondary participants;
- wherein said at least one primary participant and said at least two secondary participants are selected from the group consisting of electric controllers and electrical drive regulators.

11. A redundant ringlike communications network as defined in claim 10, wherein the network is based on a technology selected from the group consisting of Ethernet technology and fiber optical technology, wherein said data transmission is based on a field bus standard.

12. A drive system comprising a redundant ringlike communications network that communicates bidirectionally between participants of an automation network, comprising:
- at least one primary participant, wherein said at least one primary participant is configured as a master and wherein said at least one primary participant includes a data processing device and first and second network connections;
- at least two secondary participants, wherein said at least two secondary participants are configured as slaves wherein the at least one primary participant and the at least two secondary participants are connected to one another redundantly via a bidirectional connection line, wherein the bidirectional control line is based on Ethernet technology or on fiber optic technology, wherein data transmission takes place using real-time, fieldbus protocols, wherein the at least one primary participant receives at an input the first network connection, and wherein data is conducted by means of the data connection to an output of the second network connection wherein solely in an event of a malfunction in a data transmission between two of the secondary participants, said at least two secondary participants communicate with one another by means of said at least one primary participant, wherein said forwarding by the primary participant includes forwarding by the primary participant all data sent by the at least two secondary participants;
- wherein said at least one primary participant and said at least two secondary participants are selected from the group consisting of electric controllers and electrical drive regulators.

13. A drive system as defined in claim 1n claim 12, wherein the system includes a first element selected from the group consisting of an electrical controller, an electrical drive regulator, and both as a primary participant, and second elements selected from the group consisting of electrical controllers, electrical drive regulators, and both as the secondary participants.

14. A method for operating a redundant ringlike communications network that communicates bidirectionally, comprising the steps of:
- providing at least one primary participant, wherein said at least one primary participant is configured as a master, and wherein said at least one primary participant includes a data processing device and first and second network connections;
- providing at least two secondary participants, wherein said at least two secondary participants are configured as slaves, wherein the at least one primary participant and the at least two secondary participants are connected to one another redundantly via a bidirectional connection line, wherein the bidirectional control line is based on Ethernet technology or on fiber optic technology, wherein data transmission takes place using real-time, fieldbus protocols, wherein the at least one primary participant receives at an input the first network connection, and wherein data is conducted by means of the data connection to an output of the second network connection;
- wherein said at least one primary participant and said at least two secondary participants are selected from the group consisting of electric controllers and electric drive regulators; and
- processing the data telegrams exchanged by the primary participant between the secondary participants, between its data transmission device connections in such a way that the data telegrams can be distinguished from data telegrams exchanged directly between the secondary participants by means of manipulation of data fields within the data telegrams.

* * * * *